US012558764B2

(12) United States Patent
Womack

(10) Patent No.: US 12,558,764 B2
(45) Date of Patent: Feb. 24, 2026

(54) LOCKING PLIERS FOR TEMPORARY FASTENERS

(71) Applicant: Andrew G. Womack, Cedar Hill, TX (US)

(72) Inventor: Andrew G. Womack, Cedar Hill, TX (US)

(73) Assignee: Andrew G. Womack, Cedar Hill, TX (US)

( * ) Notice: Subject to any disclaimer, the term of this patent is extended or adjusted under 35 U.S.C. 154(b) by 359 days.

(21) Appl. No.: 18/215,452

(22) Filed: Jun. 28, 2023

(65) Prior Publication Data

US 2025/0001570 A1 Jan. 2, 2025

(51) Int. Cl.
*B25B 31/00* (2006.01)
*B25G 1/00* (2006.01)

(52) U.S. Cl.
CPC ............ *B25B 31/005* (2013.01); *B25G 1/005* (2013.01)

(58) Field of Classification Search
CPC .. B25B 7/02; B25B 7/14; B25B 31/00; B25B 31/005; B25B 5/00; B25B 5/068; B25B 5/14; B25B 5/16; B25G 1/005; B25G 1/04; B25G 1/06; B25G 1/10; B23P 19/04; Y10S 7/901
See application file for complete search history.

(56) References Cited

U.S. PATENT DOCUMENTS

| | | | | |
|---|---|---|---|---|
| 1,492,908 | A * | 5/1924 | Trumbo | B67B 3/10 99/581 |
| 2,328,866 | A | 9/1943 | Van Sittert et al. | |
| 2,354,480 | A * | 7/1944 | Rossmann | B25B 31/005 269/48.4 |
| 2,546,616 | A | 3/1951 | Schaaff | |
| 2,601,117 | A | 6/1952 | Graham | |
| 2,620,697 | A | 12/1952 | Sarvie | |
| 2,686,960 | A | 8/1954 | Le Roy | |
| 2,755,541 | A | 7/1956 | Kruger | |
| 2,814,860 | A | 12/1957 | McCaleb | |
| 3,662,449 | A | 5/1972 | Hashimoto | |
| 3,909,905 | A | 10/1975 | Giordano | |
| 4,073,046 | A | 2/1978 | Ramsden | |
| 4,075,749 | A * | 2/1978 | Hubeny | B25B 7/02 29/268 |
| 4,635,510 | A | 1/1987 | Box | |
| 4,709,841 | A | 12/1987 | Wollar | |
| 4,821,610 | A | 4/1989 | Redmon, Jr. et al. | |
| 5,893,303 | A | 4/1999 | Harris | |
| 6,178,855 | B1 | 1/2001 | Bally et al. | |
| D448,451 | S | 9/2001 | Turnbull | |

(Continued)

*Primary Examiner* — Robert J Scruggs
(74) *Attorney, Agent, or Firm* — Conley Rose, P.C.

(57) ABSTRACT

A pair of cleco pliers includes a first handle defining a first receptacle at a distal end thereof. In addition, the pair of cleco pliers includes a second handle pivotably coupled to the first handle and defining a second receptacle at a distal end of the second handle, and wherein the first receptacle and the second receptacle are configured to jointly receive a temporary fastener. The pair of cleco pliers further includes one or more magnets received in at least one of the first receptacle and the second receptacle configured to secure the temporary fastener within the first receptacle and the second receptacle via a magnetic biasing force applied by the one or more magnets to the temporary fastener.

7 Claims, 10 Drawing Sheets

(56) References Cited

U.S. PATENT DOCUMENTS

| | | | |
|---|---|---|---|
| 6,516,505 B1 | 2/2003 | Taylor | |
| 6,622,596 B2 | 9/2003 | Janusz et al. | |
| 6,678,930 B1 | 1/2004 | Dwoc | |
| 6,862,961 B2 | 3/2005 | Winkler | |
| 6,973,859 B2 | 12/2005 | Noniewicz | |
| 7,048,266 B2 | 5/2006 | Starr | |
| 7,070,375 B2 | 7/2006 | Hoeckelman | |
| 7,086,312 B1 | 8/2006 | Tortolani | |
| 7,891,924 B2 | 2/2011 | Mercer et al. | |
| 8,534,168 B2 | 9/2013 | Marks et al. | |
| 8,534,651 B2 | 9/2013 | Scapa et al. | |
| 8,826,775 B2 * | 9/2014 | Vienneau | B25C 3/006 7/167 |
| 9,027,447 B2 | 5/2015 | Cripps | |
| 2005/0120837 A1 | 6/2005 | Hsien | |
| 2005/0198773 A1 | 9/2005 | Alonso | |
| 2006/0101948 A1 * | 5/2006 | Meitzler | B25B 23/12 81/487 |
| 2007/0221016 A1 * | 9/2007 | Herbst | B25G 1/00 81/415 |
| 2008/0066588 A1 | 3/2008 | Yang | |
| 2008/0264216 A1 | 10/2008 | Duffy | |
| 2010/0000140 A1 * | 1/2010 | Nien | A01K 97/14 81/367 |
| 2010/0005640 A1 | 1/2010 | Fuller | |
| 2013/0239760 A1 | 9/2013 | Lucas | |
| 2013/0319180 A1 | 12/2013 | Des Courtis et al. | |
| 2014/0000085 A1 | 1/2014 | Teller et al. | |
| 2015/0059139 A1 | 3/2015 | Dantas | |
| 2015/0321329 A1 * | 11/2015 | Bruno | B25C 3/008 81/44 |

* cited by examiner

LOCKING PLIERS FOR TEMPORARY FASTENERS

CROSS-REFERENCE TO RELATED APPLICATIONS

Not applicable.

STATEMENT REGARDING FEDERALLY SPONSORED RESEARCH OR DEVELOPMENT

Not applicable.

FIELD OF INVENTION

This disclosure generally relates to tools for installing and removing fasteners, and more particularly, temporary fasteners used to precisely and securely hold two or more parts, such as sheet materials, together. Such temporary fasteners may include, for example, temporary fasteners commonly referred to as cleco fasteners or simply "clecos".

BACKGROUND

In sheet metal fabrication and assembly, particularly in the area of aircraft and other vehicle manufacturing, it is frequently necessary to temporarily hold two or more workpieces in the form of thin-walled material (e.g., sheet metal) together. Specialized pliers are used to install and remove temporary fasteners, such as clecos. The workpiece material is typically in the form of thin sheets of metal or other materials having aligned predrilled holes used to temporarily hold two or more of the workpieces together, so that riveting, drilling, cutting, fitting, sizing, filing, deburring, bending, and other metal fabrication tasks can be performed accurately. The temporary fasteners installed in the aligned holes of the workpieces are configured to expand on the far side of the workpiece material to draw and clamp them together while maintaining alignment between the respective workpieces.

SUMMARY

An embodiment of a pair of cleco pliers for installing and removing temporary fasteners comprises a first handle, extending between a proximal end and a longitudinally opposed distal end, the first handle having a pair of lateral sides extending between the proximal end of the first handle and the distal end of the first handle, wherein the first handle defines a first receptacle at the distal end. In addition, the pair of cleco pliers comprises a second handle pivotably coupled to the first handle and extending between a proximal end and a longitudinally opposed distal end of the second handle, the second handle having a pair of lateral sides extending between the proximal end of the second handle and the distal end of the second handle, wherein the second handle defines a second receptacle at the distal end of the second handle, and wherein the first receptacle and the second receptacle are configured to jointly receive a temporary fastener. The pair of cleco pliers further comprises one or more magnets received in at least one of the first receptacle and the second receptacle configured to secure the temporary fastener within the first receptacle and the second receptacle via a magnetic biasing force applied by the one or more magnets to the temporary fastener. In some embodiments, the one or more magnets comprises a first magnet received in the first receptacle and a second magnet received in the second receptacle. In certain embodiments, the one or more magnets comprises a first magnet received in the first receptacle aligned with a central axis of the first receptacle, the first magnet configured to apply a magnetic biasing force to a terminal end of the temporary fastener when the temporary fastener is jointly received in the first receptacle and the second receptacle. In certain embodiments, the one or more magnets comprises a second magnet received in the second receptacle offset from a central axis of the second receptacle, the second magnet configured to apply an orienting force to the temporary fastener when the temporary fastener is jointly received in the first receptacle and the second receptacle, urging the temporary fastener to pivot about a terminal end thereof. In certain embodiments, the one or more magnets further comprises a third magnet also received in the second receptacle and circumferentially spaced about the central axis of the second receptacle. In certain embodiments, the one or more magnets comprises a pair of magnets received in the second receptacle, the pair of magnets circumferentially spaced about a central axis of the second receptacle. In certain embodiments, the pair of magnets are each offset from the central axis of the second receptacle. In some embodiments, the pair of cleco pliers further comprises, a bearing assembly is coupled between the first handle and the second handle for rotatably coupling the first handle with the second handle. In some embodiments, the pair of cleco pliers still further comprises, a catch assembly coupled to at least one of the first handle and the second handle for maintaining the cleco pliers in a locked configuration.

An embodiment of a pair of cleco pliers for installing and removing temporary fasteners comprises a first handle, extending between a proximal end and a longitudinally opposed distal end, the first handle having a pair of lateral sides extending between the proximal end of the first handle, and the distal end of the first handle, wherein the first handle defines a first receptacle at the distal end. In addition, the pair of cleco pliers comprises a second handle pivotably coupled to the first handle and extending between a proximal end and a longitudinally opposed distal end of the second handle, the second handle having a pair of lateral sides extending between the proximal end of the second handle and the distal of the second handle, wherein the second handle defines a second receptacle at the distal end of the second handle and having an opening formed along one of the pair of lateral sides of the second handle, wherein the first receptacle and the second receptacle are configured to jointly receive a temporary fastener. In some embodiments, the first receptacle is defined by a frustoconical inner surface that extends into the first handle along a central axis or longitudinal axis from an open end thereof to an opposing enclosed or terminal end positioned along a central axis of the first receptacle. In certain embodiments, the second receptacle is defined by a U-shaped shoulder extending partially about a central axis of the second receptacle. In certain embodiments, the second receptacle is defined by an inner inclined surface extending at a non-zero angle to a central axis of the second handle. In some embodiments, the pair of cleco pliers further comprises a magnet located along the inner inclined surface of the second receptacle and configured to apply a magnetic orienting force to the temporary fastener when the temporary fastener is jointly received in the first receptacle and the second receptacle urging the temporary fastener to pivot towards the inner inclined surface. In some embodiments, the pair of cleco pliers further comprises one or more magnets received in at least one of the first receptacle and the second receptacle configured to secure the temporary fastener within the first receptacle and the second receptacle via a magnetic biasing force applied by the one or more magnets to the temporary fastener.

An embodiment of a pair of cleco pliers for installing and removing temporary fasteners comprises a first handle, extending between a proximal end and a longitudinally opposed distal end, the first handle having a pair of lateral sides extending between the proximal end of the first handle, and the distal end of the first handle, wherein the first handle defines a first receptacle at the distal end. In addition, the pair of cleco pliers comprises a second handle pivotably coupled to the first handle and extending between a proximal end and a longitudinally opposed distal end of the second handle, the second handle having a pair of lateral sides extending between the proximal end of the second handle and the distal end of the second handle, wherein the second handle defines a second receptacle at the distal end, wherein the first receptacle and the second receptacle are configured to receive a temporary fastener. In some embodiment, the pair of cleco pliers comprises a coupling assembly comprising a fastener and locknut configured to apply tension to the fastener to secure the first handle and the second handle. In some embodiment, the pair of cleco pliers further comprises a bearing assembly coupled between the first handle and the second handle and comprising at least one thrust bearing configured to receive thrust loads from the first handle and the second handle as a result of the tension applied to the fastener by the locknut. In certain embodiments, the bearing assembly comprises a one or more ball bearings configured to permit relative rotation between the fastener and at least one of the first handle and the second handle. In certain embodiments, the bearing assembly further comprises a pair of the one or more ball bearings, the at least one thrust bearing being sandwiched between the pair of the one or more ball bearings. In certain embodiments, the thrust bearing comprises a pair of opposed annular bearing races extending around and aligned with a central axis of the fastener. In some embodiments, the pair of cleco pliers further comprises a catch assembly coupled to at least one of the first and the second handle for maintaining the cleco pliers in a locked configuration, the catch assembly comprising a catch pivotably coupled to the second handle, a proximal handle coupled to the catch and projecting towards the proximal end of the second handle, and an opposing distal handle coupled to the catch and projecting towards the distal end of the second handle.

BRIEF DESCRIPTION OF THE DRAWINGS

For a detailed description of disclosed exemplary embodiments, reference will now be made to the accompanying drawings in which.

DETAILED DESCRIPTION

Figure 1:
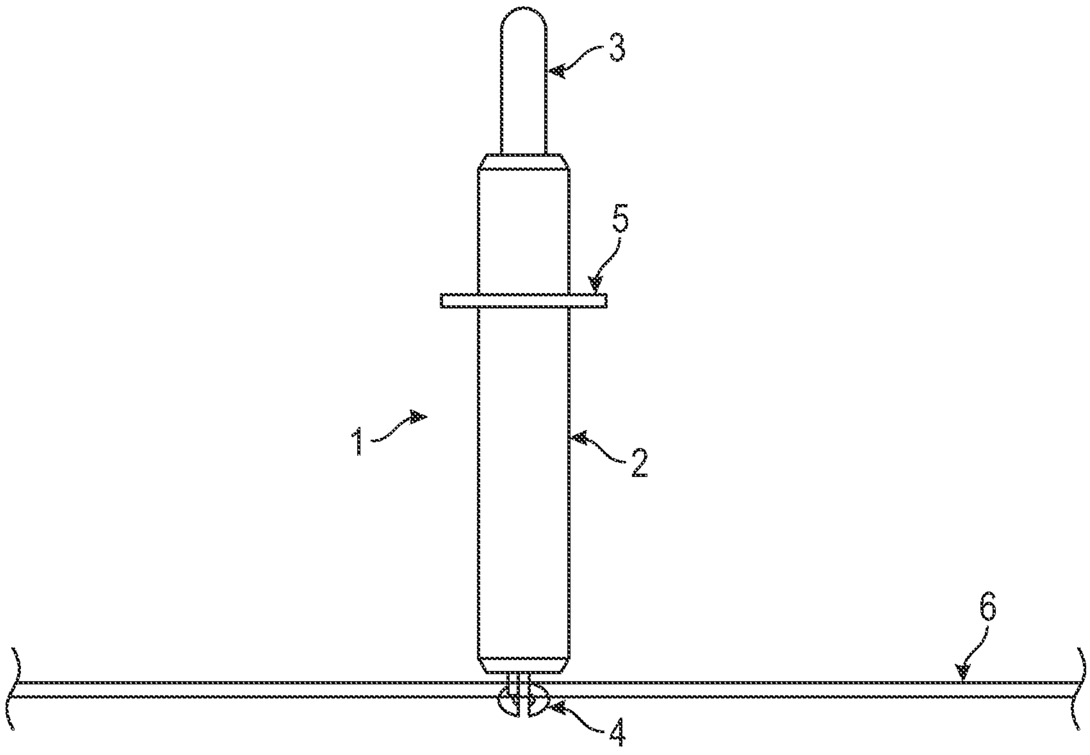
FIG. 1 (Prior Art)
FIG. 1 is a perspective view of a typical cleco relative to the thin sheets of metal in which the cleco is to be installed.

The following discussion is directed to various embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms “including” and “comprising” are used in an open-ended fashion, and thus should be interpreted to mean “including, but not limited to . . . ” Also, the term “couple” or “couples” is intended to mean either an indirect or direct connection. Thus, if a first device couples to a second device, that connection may be through a direct connection, or through an indirect connection as accomplished via other devices, components, and connections. In addition, as used herein, the terms “axial” and “axially” generally mean along or parallel to a central axis (e.g., central axis of a body or a port), while the terms “radial” and “radially” generally mean perpendicular to the central axis. For instance, an axial distance refers to a distance measured along or parallel to the central axis, and a radial distance means a distance measured perpendicular to the central axis. Any reference to up or down in the description and the claims is made for purposes of clarity, with “up”, “upper”, “upwardly”, “uphole”, or “upstream” meaning toward the surface of the borehole and with “down”, “lower”, “downwardly”, “downhole”, or “downstream” meaning toward the terminal end of the borehole, regardless of the borehole orientation.

Referring initially to FIG. 1, a typical cleco 1, generally includes a cylindrical body 2; having a spring located inside the cylindrical body; a cleco plunger 3 located at a top of the cylindrical body 2, and a cleco ridge 5, which wraps around the circumference of the cleco body 2. A cleco also typically include a pair of step-out locks 4, with a pair of locking jaws extending out of a bottom of the cylindrical body 2, and a spreader bar located between the pair of locking jaws. The cleco 1 is installed in predrilled aligned holes of the workpieces 6. In the interest of convenience and clarity, pliers configured for installing and removing temporary fasteners are referred to as “cleco pliers” herein. However, it may be understood that embodiments of cleco pliers described herein may be suitable for installing temporary fasteners other than clecos.

Cleco pliers are often either hand operated, or pneumatically powered via compressed air for compressing the temporary fastener prior to installation. Attempts to use powered cleco pliers have typically been unsatisfactory due to the inconvenience presented by equipment attendant pneumatic pliers (e.g., an air compressor, regulator), compressor requirements, and other issues. Thus, traditional hand operated pliers are often used to install and remove clecos, especially among non-commercial users such as hobbyists and the like.

Traditional cleco pliers have opposing handles at one end of the user's hand and are attached by a pivot joint. On the opposite side of the pivot joint, there are jaws which engage the cleco when the jaws of the pliers are pivotably squeezed together. The plunger of the cleco rests against the jaws of the cleco plier, which depresses it when the user squeezes the pliers, thereby activating the cleco. Traditional cleco pliers requires the use of both hands-One to load the temporary fastener and one to collapse it while installing the fastener. The muscles of the user's hand must remain engaged exerting a compressive force on the handles of the cleco pliers to maintain the collapsed state of the temporary fastener until it is fully installed.

Traditional cleco pliers are durable, inexpensive and convenient to produce but they also put the user's hand, wrist, and arm at an awkward angle relative to the cleco and the work pieces to be fastened by the cleco. This awkward angle makes cleco installation uncomfortable, cumbersome, and inefficient. Over prolonged and repeated use, this awkward position can cause pain, fatigue, and ligament or joint damage such as carpal tunnel syndrome and arthritis. Additionally, the inline or near horizontal orientation of the cleco relative to the work surface makes temporary fastener rotation and proper placement difficult during installation.

Accordingly, embodiments of manual cleco pliers are described herein which incorporate magnets configured to automatically capture the cleco into the correct location within the pliers. Additionally, embodiments of cleco pliers described herein include a catch assembly which holds the cleco in a locked configuration, making the cleco less cumbersome to install, with improved ergonomic considerations for the user.

Figure 2:
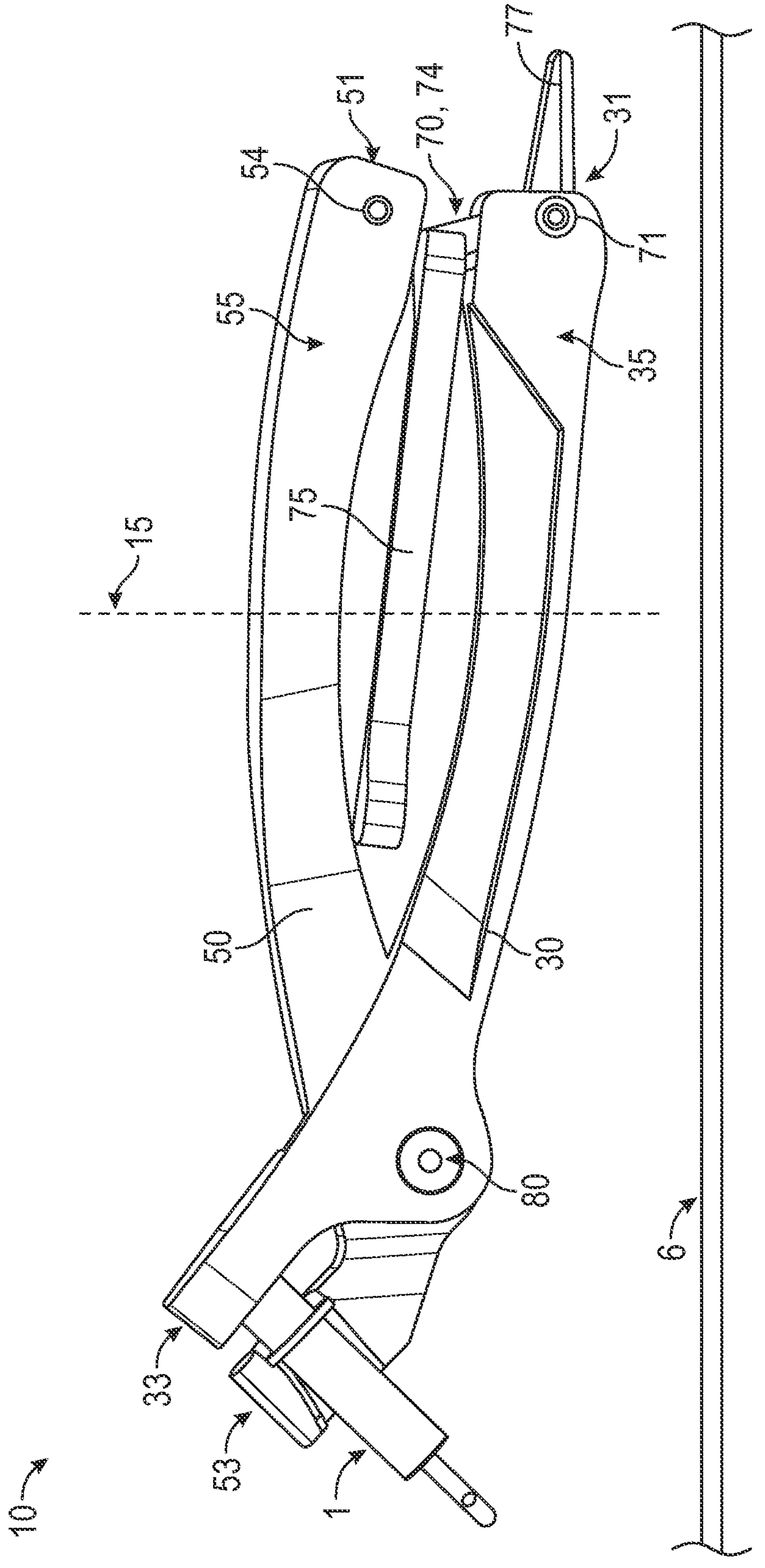
FIG. 2 is a perspective view of an embodiment of a pair of cleco pliers in a locked configuration in accordance with principles disclosed herein.
Figure 3:
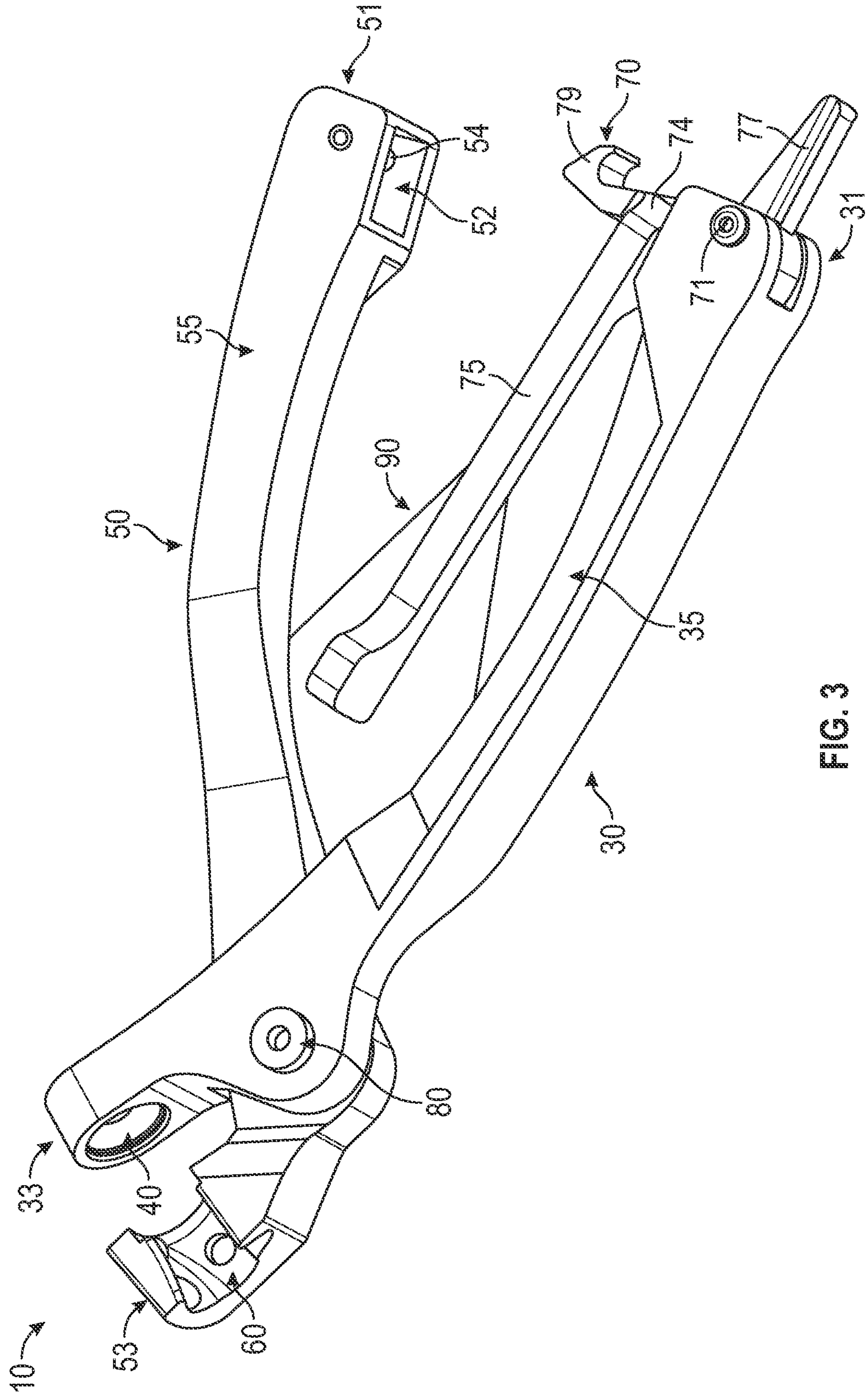
FIG. 3 is a perspective view of the cleco pliers of FIG. 2 in an unlocked configuration in accordance with principles disclosed herein.
Figure 4:
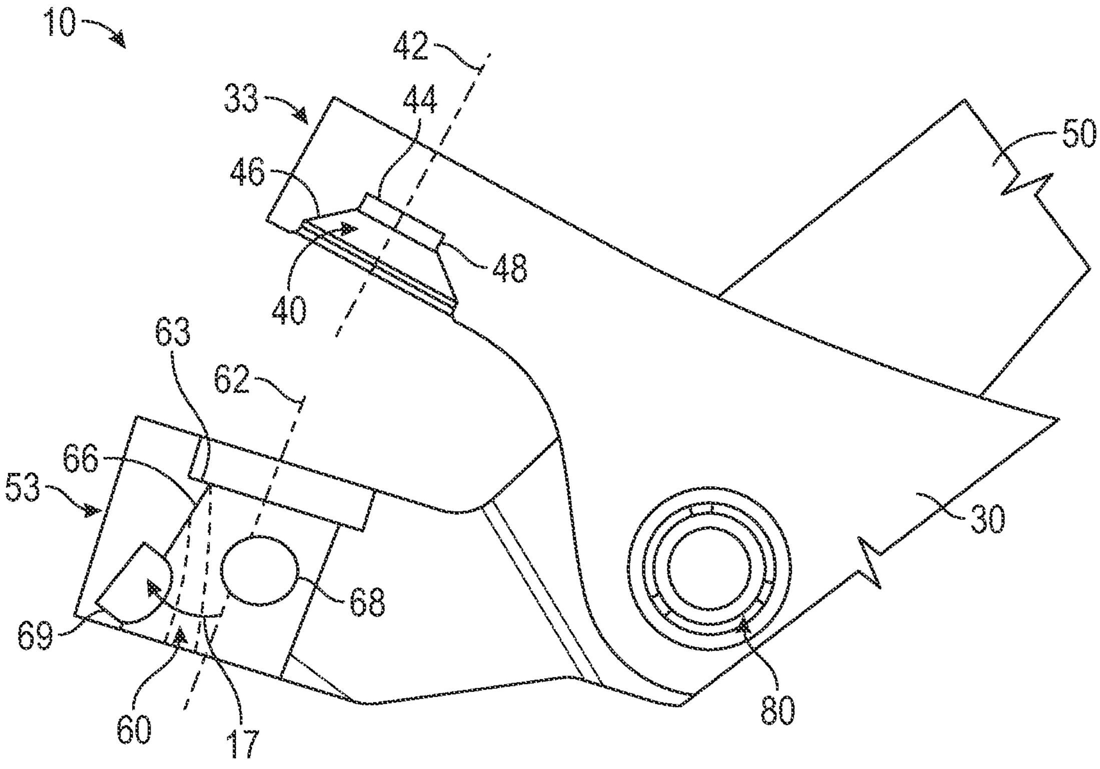
FIG. 4 is an enlarged side cross-sectional view of the cleco pliers of FIG. 2.

Referring now to FIGS. 2-4, an embodiment of manually operated cleco pliers 10 used to install and remove temporary fasteners such as the cleco 1 is shown. In this exemplary embodiment, the cleco pliers 10 includes a handle axis 15 that is positioned substantially perpendicular relative to the workpieces 6 in which a cleco 1 is to be inserted. Additionally, cleco pliers 10 generally includes a first handle 30, a second handle 50, a catch assembly 70, and a torsion spring 90 coupled between the pair of handles 30 and 50. As will be discussed further herein, the pair of handles 30 and 50 of cleco pliers 10 define receptacles 40 and 60, respectively, and are attached by a coupling assembly 80 having a bearing assembly 85. The first handle 30 and the second handle 50 enable a user to manually operate the cleco pliers 10 and thereby activate the cleco 1.

Figure 5:
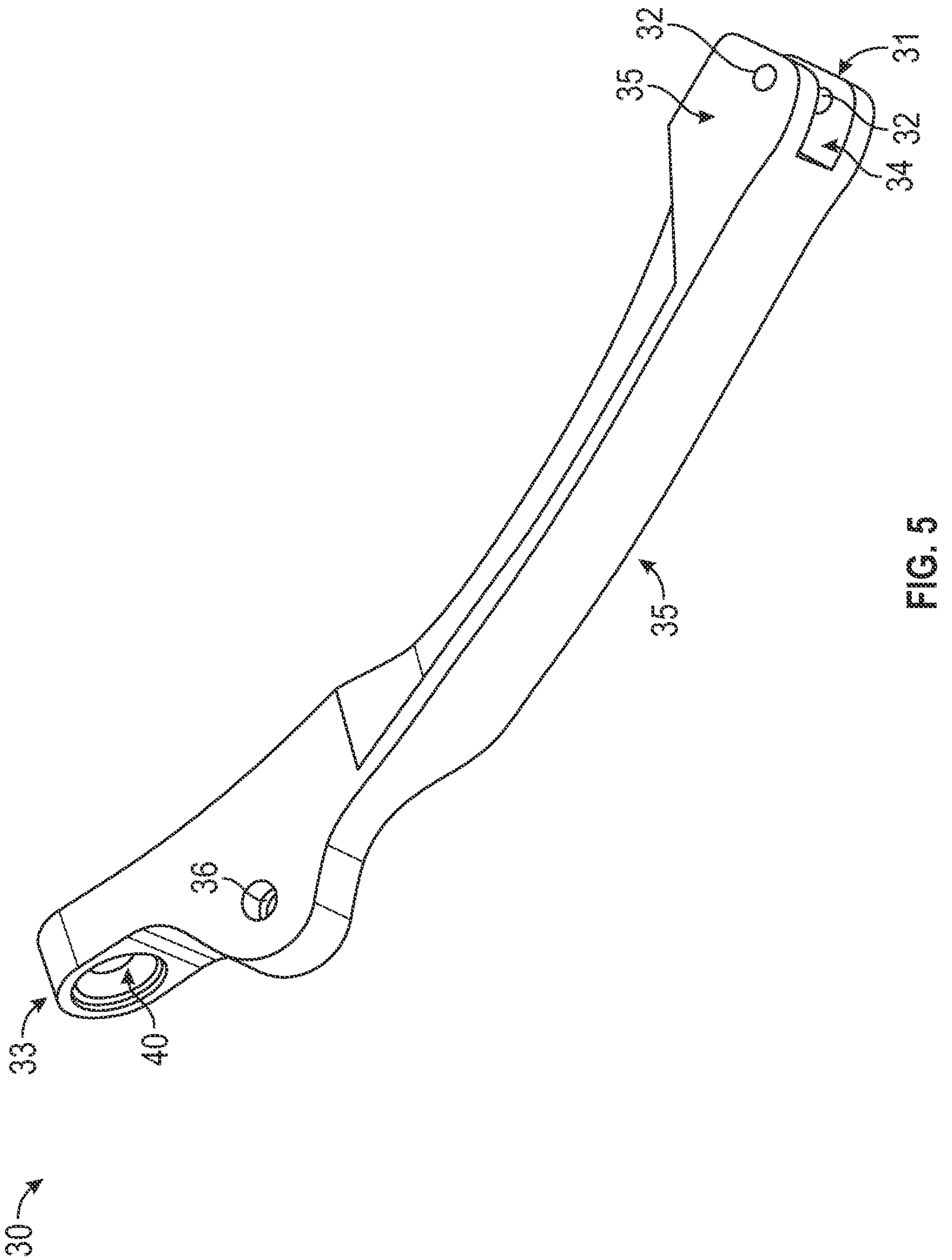
FIG. 5 is a perspective view of an embodiment of a first handle of the cleco pliers of FIG. 2 in accordance with principles disclosed herein.

Referring to FIG. 5, in this exemplary embodiment, the first handle 30 of cleco pliers 10 extends between a proximal end 31, where a user's hand contacts or grips the first handle 30, and a longitudinally opposed distal end 33 for engaging the cleco 1. Additionally, first handle 30 has a pair of opposing lateral sides 35 extending between the proximal end 31 and the distal end 33. The first handle 30 includes an opening 36 located between ends 31 and 33 for receiving a portion of the coupling assembly 80. Further, a slot 34 is formed at the proximal end 31 of first handle 30 along with a pair of openings 32 flanking the slot 34, where slot 34 is configured to receive the catch 74.

As described above, first handle 30 defines a first receptacle 40 which is located at the distal end 33 thereof and which contacts the cleco 1 during installation and removal. The first receptacle 40 may be formed as part of the first handle 30 or attached to it. Referring to FIG. 4, the first receptacle 40 is defined by a generally frustoconical inner surface 46 and extends into first handle 30 along a central or longitudinal axis 42 from an open end thereof to an opposing enclosed or terminal end 44 positioned along the central axis 42. Additionally, at least one magnet 48 is positioned within the first receptacle 40 at the terminal end 44 thereof. During installation and removal of the cleco 1, the plunger 3 of cleco 1 is biased towards (e.g., via a biasing magnetic force applied to the cleco 1 by magnet 48) and contacts the magnet 48 to automatically capture the cleco 1 within the first receptacle 40. Additionally, the biasing magnetic force applied to the cleco 1 by magnet 48 orients the cleco 1 into a desired position such that when the user squeezes the pair of handles of the cleco pliers 10, the first receptacle 40 depresses the cleco plunger 3.

Figure 6:
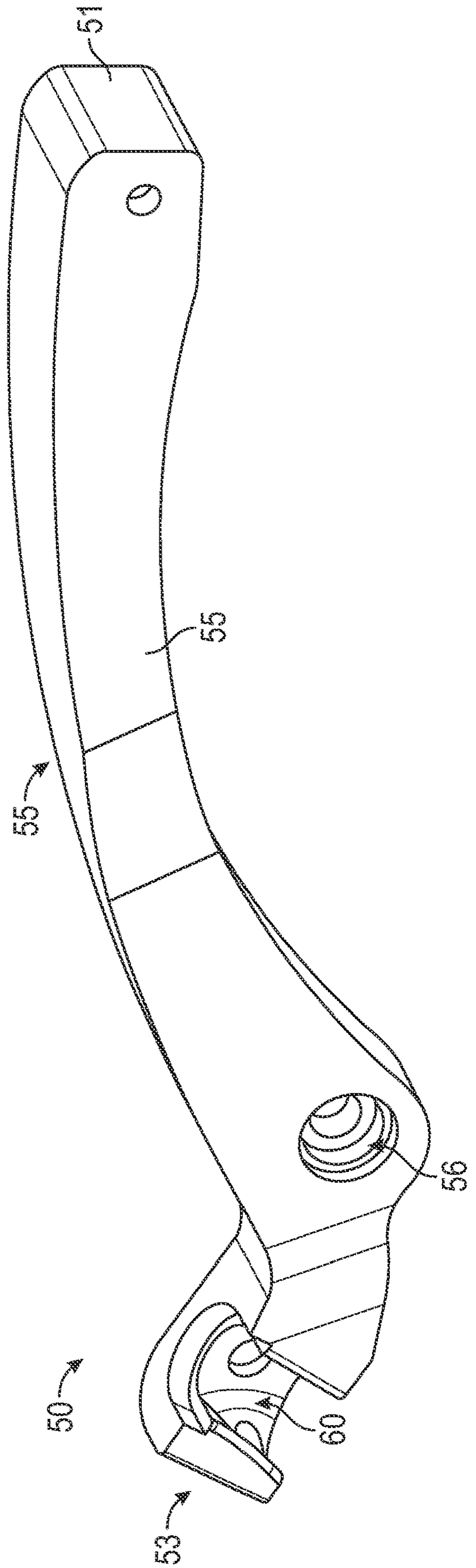
FIG. 6 is a perspective view of an embodiment of a second handle of the cleco pliers of FIG. 2 in accordance with principles disclosed herein.

Referring to FIGS. 3 and 6, in this exemplary embodiment, the second handle 50 of cleco pliers 10 extends between a proximal end 51 where a user's hand contacts the second handle 50, and a longitudinally opposed distal end 53. The second handle 50 has a pair of opposed lateral sides 55 extending between the proximal end 51 and the distal end 53 of second handle 50. Additionally, second handle 50 has an opening 56 located between ends 51 and 53 for receiving another portion of the coupling assembly 80. Further, second handle 50 includes a receptacle 52 (shown in FIG. 3) located at the proximal end 51 thereof and oriented in the direction of first handle 30 (e.g., formed between the pair of lateral sides 55) for receiving the catch 74. Particularly, an elongate locking member or cylinder 54 extends laterally through the catch receptacle 52 for locking the catch 74, as will be discussed further herein.

As described above, second handle 50 defines a second receptacle 60 which is located at the distal end 53 thereof and which contacts the cleco 1 during installation and removal. The second receptacle 60 may be formed as part of the second handle 50 or attached to it. Referring to FIGS. 3 and 4, the second receptacle 60 is generally U-shaped having an open end or opening 64 formed along one of the lateral sides 55 of second handle 50. In this configuration, the distal end 53 of second handle 50 is enclosed with the cleco 1 being insertable into the second receptacle 60 via the opening 64 of second receptacle 60 formed along the lateral side 55 of second handle 50. Additionally, second receptacle 60 defines a U-shaped ledge or shoulder 63 extending arcuately (e.g., partially) about and coincident with the central axis 62 of second receptacle 60.

Second receptacle 60 extends entirely through the second handle 50 along a central or longitudinal axis 62 thereof. Additionally, second receptacle 60 defines a pair of inner recesses in which a pair of circumferentially spaced magnets 68 and 69 are received. Particularly, in this exemplary embodiment, magnets 68 and 69 are circumferentially spaced approximately 90 degrees about the central axis 62 of the second receptacle 60; however, it may be understood that in other embodiments the circumferential spacing of magnets 68 and 69 may vary. In this exemplary embodiment, magnet 68 is positioned opposite the opening 64 of second receptacle 60 while magnet 69 is positioned circumferentially between magnet 68 and opening 64 towards the distal end 53 of second handle 50. Additionally, magnet 69 is positioned along an inner inclined surface 66 partially defining the second receptacle 60. Particularly, inclined surface 66 is located towards the distal end 53 of second handle 50 and extends at a non-zero angle (e.g., an acute angle) to the central axis 62 of second receptacle 60.

During installation of the cleco 1 into the second receptacle 60 of second handle 50, the U-shaped shoulder 63 catches on the cleco ridge 5, and the pair of magnets 68 and 69 each apply a magnetic biasing force against the cleco 1, causing the cleco 1 to pivot into a preferred orientation as the cleco pliers 10 is actuated. Particularly, as will be discussed further herein, magnet 69 biases the cleco 1 towards the inclined surface 66 of second receptacle 60 such that cleco 1 may maintain a desired orientation (e.g., in alignment with central or longitudinal axis 42 of first receptacle 40) during the actuation of cleco pliers 10.

Figure 7:
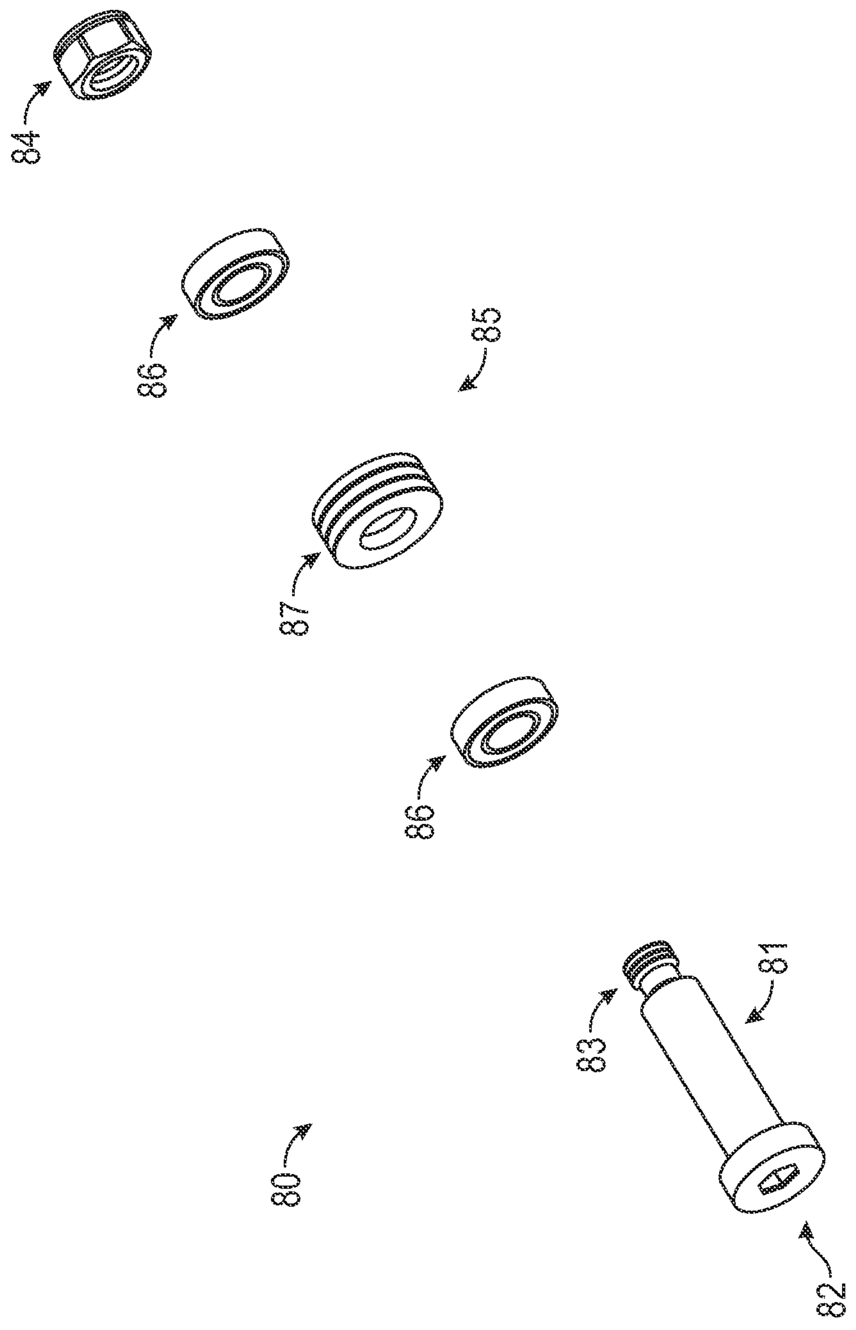
FIG. 7 is a perspective exploded view of an embodiment of a bearing assembly of the cleco pliers of FIG. 2 in accordance with principles disclosed herein.
Figure 8:
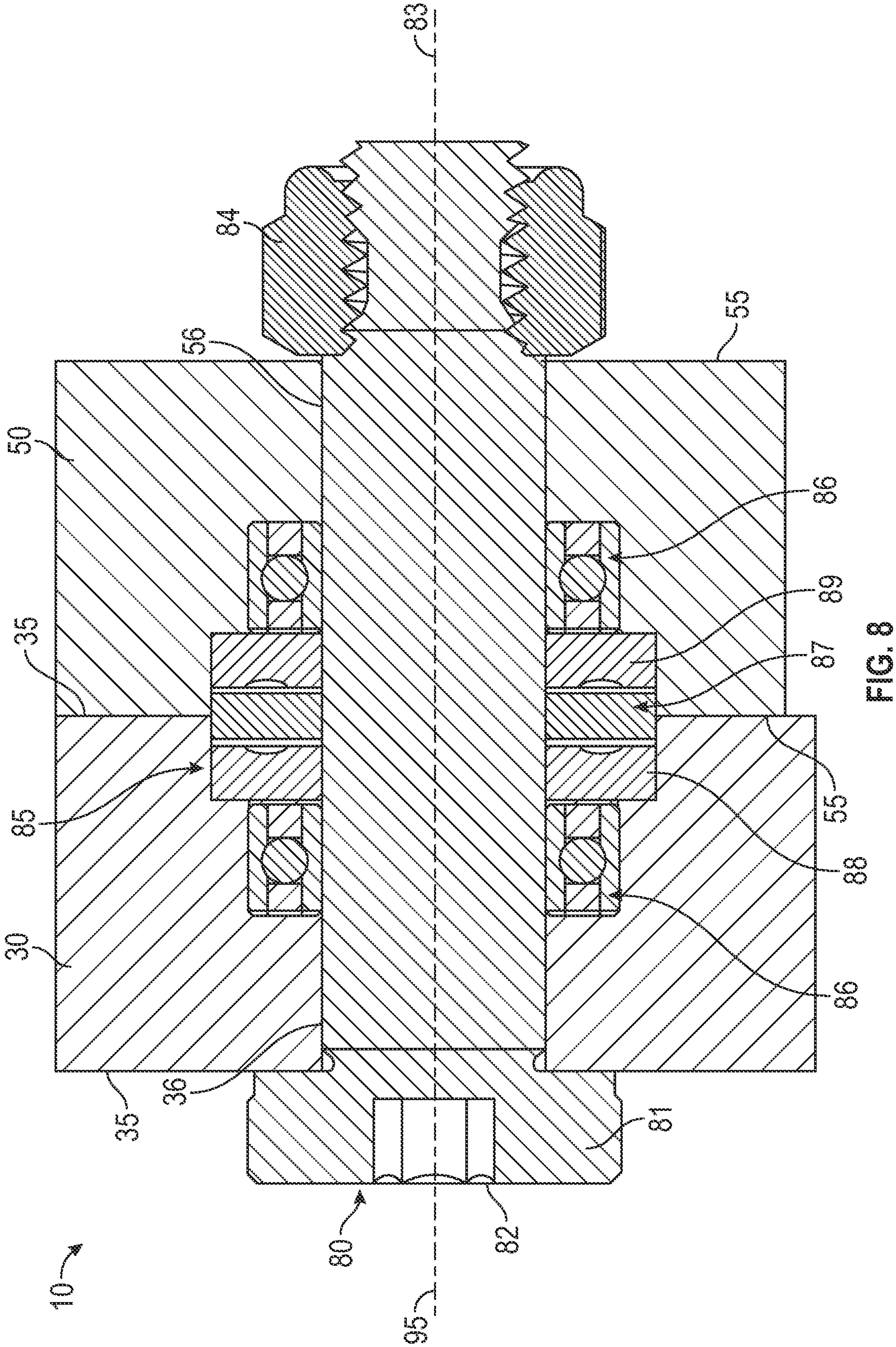
FIG. 8 is a cross-sectional view of the cleco pliers of FIG. 2.

Referring to FIGS. 7 and 8, the first handle 30 is pivotably attached to the second handle 50 of cleco pliers 10 by a coupling assembly 80. In this exemplary embodiment, coupling assembly 80 comprises a fastener 81 and a locking nut 84. Fastener 81 extends between a first end or flanged head 82 and an opposing second or externally threaded end 83. Additionally, fastener 81 extends longitudinally through both the opening 36 of the first handle 30 and the opening 56 of the second handle 50. Particularly, in this exemplary embodiment, the head 82 of fastener 81 rests against an outer lateral side 35 of the first handle 30 while the threaded end 83 of fastener 81 projects from an outer lateral side 55 of the second handle 50. Locking nut 84 of coupling assembly 80 is internally threaded and threadably attaches to the threaded end 83 of fastener 81 to thereby secure the handles 30 and 50 together via the coupling assembly 80.

Bearing assembly 85 of cleco pliers 10 is positioned within the openings 36 and 56 of handles 30 and 50. Additionally, bearing assembly 85 is positioned about the fastener 81 and is located between the head 82 of fastener 81 and the locking nut 84. In this exemplary embodiment, bearing assembly 85 generally includes a pair of radial bearings 86 (e.g., radial ball bearings); and at least one thrust bearing 87 centered between the pair of radial bearings 86 and an annular thrust bearing 87 sandwiched between the outer pair of radial bearings 86.

Particularly, thrust bearing 87 includes an annular first bearing race 88, an opposing annular second bearing race 89, and a plurality of rolling elements (e.g., balls, rollers) positioned between the opposed bearing races 88 and 89. The rolling elements of thrust bearing 87 are retained in an annular central retainer sandwiched between the pair of bearing races 88 and 89; however, it may be understood that in other embodiments the thrust bearing 87 may not include a central retainer.

The thrust bearing 87, together with the pair of radial bearings 86 allow the first handle 30, and the second handle 50 to rotate relative to each other without needing to introduce a significant degree of play in the coupling assembly 80. In this exemplary embodiment, the first bearing race 88 contacts the first handle 30 while the second bearing race 89 contacts the second handle 50 where the first bearing race 88 is permitted to rotate relative to the second bearing race 89 about a pivot axis 95 (shown in FIG. 8) extending coincident with a central or longitudinal axis of fastener 81. In other words, fastener 81 defines the pivot axis 95 about which handles 30 and 50 are permitted to pivot. By permitting bearing races 88 and 89 to rotate relative to each other about pivot axis 95, tension may be applied to fastener 81 (e.g., via tightening locking nut 84 against the fastener 81) to minimize play in the pair of handles 30 and 50 without adding significant friction between the pair of handles 30 and 50 when pivoting handles 30 and 50 about pivot axis 95.

Figure 9:
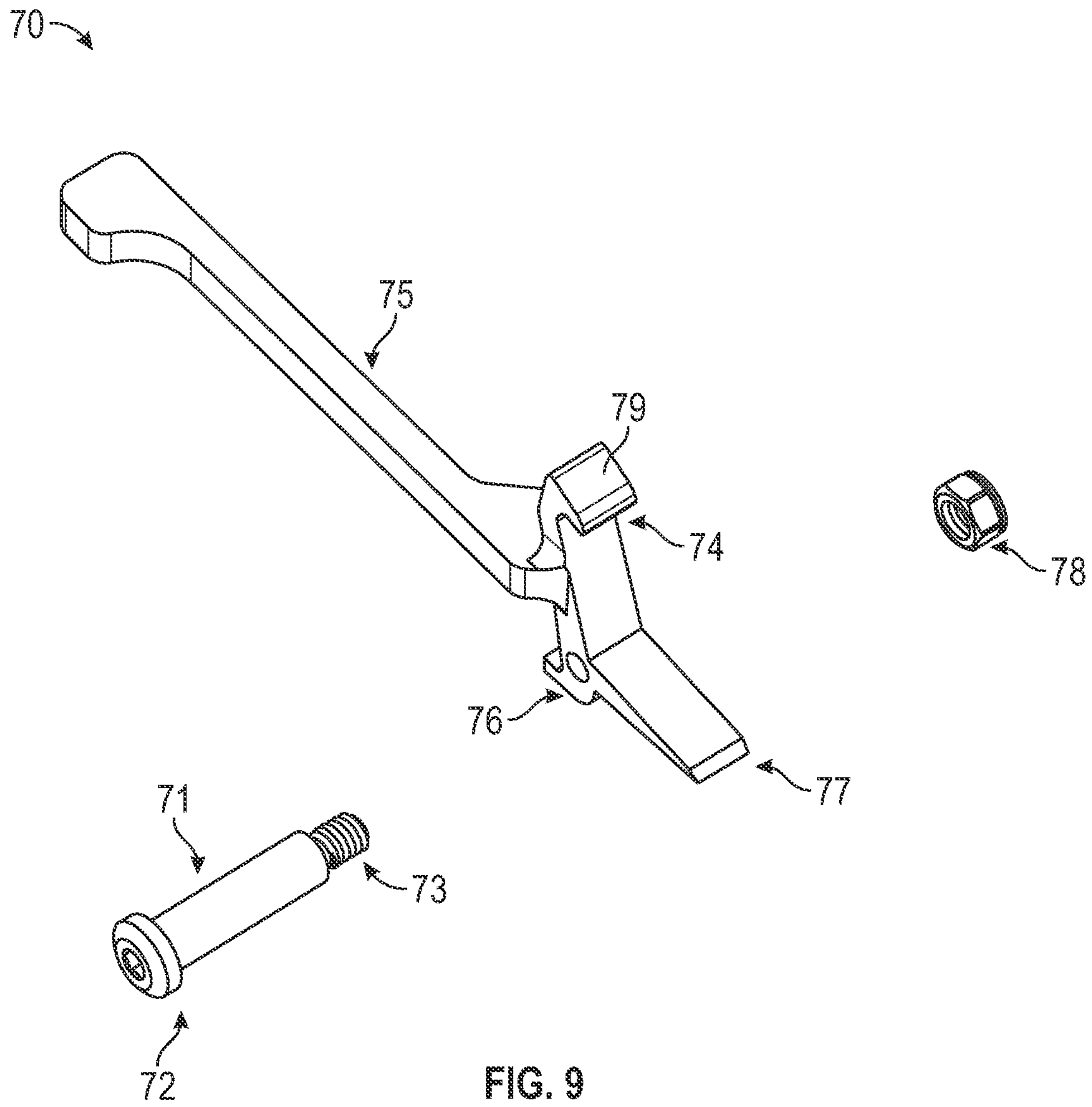
FIG. 9 is a perspective exploded view of an embodiment of a catch assembly of the cleco pliers of FIG. 2 in accordance with principles disclosed herein.

Referring to FIGS. 3, 5 and 9, the catch assembly 70 is pivotably coupled to the first handle 30 such that the catch assembly 70 is at least partially positioned in the slot 34 formed at the proximal end 31 of the first handle 30. In this exemplary embodiment, catch assembly 70 generally includes an elongate fastener 71; a catch 74, a first or distal handle 75, a second or proximal handle 77, and a locknut 78. In this exemplary embodiment, catch 74 of catch assembly 70 comprises a pair of lateral sides extending between a first or pivot end and an opposing second or free end defined by a concave or C-shaped hook 79; and a pair of openings 76 located at the joint end. Particularly, in this exemplary embodiment, the hook 79 of the catch 74 is configured to latch on the locking cylinder 54 extending laterally through the catch receptacle 52 of the second handle 50. In this manner, locking cylinder 54 and catch 74 work together in concert to maintain the cleco pliers 10 in a locked configuration (shown in FIG. 2).

As shown particularly in FIG. 9, the fastener 71 of catch assembly 70 extends between a first end defined by a flanged head 72 and an opposing second or externally threaded end 73. When assembled with first handle 30, the fastener 71 extends longitudinally through both the openings 32 of the first handle 30 and the pair of openings 76 of the catch 74 to pivotably couple the catch 74 to the first handle 30 whereby catch 74 may rotate about a rotational or pivot axis coincident with a central axis of the fastener 71. Additionally, when assembled, the head 72 of fastener 71 rests against an outer lateral side 35 of the first handle 30 while the threaded end 73 of fastener 71 projects from the opposing inner lateral side 35 of the first handle 30. Further, locknut 78 of catch assembly 70 (which is internally threaded) threadably attaches to the threaded end 73 of fastener 71 to secure the catch 74 in the slot 34.

Distal handle 75, and proximal handle 77 of catch assembly 70 are coupled to opposing lateral side of the catch 74 in this exemplary embodiment. In some embodiments, handles 75 and/or 77 are formed monolithically with catch 74 while in other embodiments handles 75 and/or 77 are formed separately from catch 74 and are coupled thereto. Distal handle 75 is configured to release the catch 74 from the locking cylinder 54 (thereby releasing the cleco pliers 10 from the locked configuration) in response to the user's thumb (or other appendage) pressing against the distal handle 75. Additionally, proximal handle 77 is also configured to release catch 74 from locking cylinder 54 in response the user's pinkie finger (or other appendage) pressing against the proximal handle 77. In this manner, catch 74 may be conveniently released from locking cylinder 54 by the user pressing against either the distal handle 75 (projecting towards the distal end of cleco pliers 10) or the proximal handle 77 (projecting from the proximal end of cleco pliers 10) as desired by the user. For instance, depending on the arrangement of 6 and how the user is gripping the cleco pliers 10 it may be more convenient in some instances to press the distal handle 75 to unlock the cleco pliers 10 while in other instances it may be more convenient for the user to press the proximal handle 77 to unlock the cleco pliers 10. The provision of multiple handles 75 and 77 for unlocking the cleco pliers 10 thus adds to the convenience in operating the pliers 10.

Referring to FIG. 3, torsion spring 90 of cleco pliers 10 is coupled between the pair of handles 30 and 50 of cleco pliers 10 and is configured to separate the proximal ends 31 and 51 of the pair of handles 30 and 50, respectively, of the cleco pliers 10 when the catch 74 is released from the locking cylinder 54 (placing the cleco pliers 10 in an unlocked configuration). Particularly, in this exemplary embodiment, torsion spring applies a biasing force to each of the handles 30 and 50 which, given that the handles 30 and 50 are pivotably coupled together via coupling assembly 80, is translated into opposing torques applied to the pair of handles 30 and 50 urging the handles 30 and 50 to rotate about pivot axis 95 in opposed rotational directions. In some embodiments, a full open stop is attached to the pair of handles of the cleco pliers 10 and configured to limit the separation of the pair of handles of the cleco pliers 10. It may be understood that the proximal handle 77, the distal handle 75, and the torsion spring 90 work together to keep the pair of handles of the cleco pliers 10 in in an unlocked configuration (e.g., FIG. 3).

Referring now to FIGS. 3 and 4, as described above, cleco pliers 10 may be used to manually install and/or remove one or more clecos 1 from workpieces (e.g., workpieces 6). For example, with the cleco pliers 10 in the unlocked configuration as shown in FIG. 3, a user may manually contact or grip the pair of handles 30 and 50 of the cleco pliers 10 to position the cleco pliers 10 in proximity with a respective cleco 1 such that the cleco plunger 3 is oriented towards the first receptacle 40 of the first handle 30. As the cleco pliers 10 are moved closer to the cleco 1, the magnet 48 located within the first receptacle 40 of the first handle 30 exerts a magnetic biasing force against the cleco 1 to automatically capture the plunger 3 of cleco 1 within the first receptacle 40 of the first handle 30. Additionally, the shoulder 63 of the receptacle 60 of second handle 50 catches the cleco ridge 5 such that the cleco ridge 5 is positioned or landed against shoulder 63.

It may be noted that the position of opening 64 along an inner lateral side 55 of second handle 50 allows for the insertion of the cleco 1 into receptacle 60 along the lateral side 55 of second handle 50 which, in at least some instances, is less cumbersome to the user as compared to conventional cleco pliers which often position the opening at the distal end (rather than along the lateral side) of the given handle. Further, with cleco 1 receives in the receptacles 40 and 60 of handles 30 and 50, respectively, the pair of magnets 68 and 69 of second handle 50 and the magnet 48 of first handle 30 each apply a magnetic biasing force against the cleco 1, securing the cleco 1 to the pair of handles 30 and 50 of cleco pliers 10 in a preferred orientation with respect to the cleco pliers 10.

With the respective cleco 1 secured to distal end of cleco pliers 10 via the magnetic biasing forces applied by magnets 48, 68, and 69 applied to the cleco 1, the user may squeeze the pair of handles 30 and 50 of the cleco pliers 10, causing magnet 48 located in first receptacle 40 to depress the spring-loaded cleco plunger 3. Additionally, it may be noted that as the pair of handles 30 and 50 are manually squeezed together to depress the cleco plunger 3, the magnet 69 of second handle 50 applies a magnetic biasing force urging the cleco 1 towards (e.g., via pivoting the cleco 1 about the end of cleco plunger 3 contacting magnet 48) towards the magnet 69 as indicated by arrow 17 in FIG. 4. This orienting force applied by magnet 59 against cleco 1, urging cleco 1 to pivot towards magnet 69 in the orienting direction 17 may permit the cleco 1 to automatically maintain a preferred orientation (e.g., in alignment with longitudinal or central axis 42 of first receptacle 40). To state in other words, the orienting force applied by magnet 69 against cleco 1 may assist in maintaining cleco 1 an orientation which allows preferred initial engagement of cleco plunger 3 with cleco pliers 10 before the cleco plunger 3 is depressed.

The depression of cleco plunger 3 resulting from contact with magnet 48 pushes the step-out locks 4 of cleco 1 outwards from the bottom of the cylindrical body 2 thereof, allowing the pair of locking jaws of the step-out locks 4 to come together beneath the spreader bar of step-out locks 4 thereby successfully securing cleco 1 to the workpieces 6. Additionally, as the pair of handles 30 and 50 are manually squeezed together, catch 74 of cleco pliers 10 latches onto the elongate locking member or cylinder 54 to maintain the cleco 1 compressed in the locked configuration without the need for the user's hand to remain engaged in exerting a compressive force on the pair of handles 30 and 50 of cleco pliers 10.

With cleco pliers 10 in the locked configuration, the pair of locking jaws of the step-out locks 4 of cleco 1 may be slipped through the aligned holes formed in the workpieces 6 with the cleco 1 positioned substantially perpendicular to the workpieces 6. Following the insertion of cleco 1 into the aligned holes of workpiece 6, the plunger 3 of cleco 1 maybe released by shifting one of the handles 75 and 77 of catch assembly 70 (e.g., proximal handle 75 with the user's thumb, distal handle 77 with the user's pinkie finger) to unlock the catch 74.

As the cleco plunger 3 is released, the spring located in the cylindrical body 2 pulls the pair of locking jaws of the step-out locks 4 towards the spreader bar of the step-out locks 4, forcing the pair of locking jaws of the step-out locks 4 outwards to engage interior surfaces of the workpieces 6. In this manner, workpieces 6 are squeezed together between the pair of locking jaws of the step-out locks 4 and the cylindrical body 2 while maintaining the alignment between the holes formed in the workpieces 6. The configuration of cleco pliers 10 thus described herein enables the convenient one-handed use of the cleco pliers 10.

Further, it may be understood that typically multiple clecos 1 are installed along the workpieces 6 to fasten the pair of workpieces 6 together, and the process described above (e.g., installing a cleco 1 in the workpieces 6 using cleco pliers 10) may be repeated many times to fully secure together the workpieces 6. The convenience provided by cleco pliers 10 (e.g., opening 64 permitting loading the cleco 1 into receptacle 60 via a lateral side 55 of the second handle 50 rather than from the distal end 53 thereof, maintaining a desired orientation of the cleco 1 via the biasing force applied by magnet 69, catch assembly 70 serving to automatically maintain cleco pliers 10 in the locked configuration) may be leveraged across a large number of clecos 1, saving the user substantial time and energy in fastening together the workpieces 6. After the workpieces 6 are secured together, other metal fabrication tasks such as riveting, drilling, cutting, fitting, sizing, filing, deburring, and bending can be performed accurately based on the precise positioning of the workpieces 6 provided by the installed clecos 1. The clecos 1 previously fastened to the may then be removed and replaced with permanent fasteners to complete the process of attaching the workpieces 6 permanently together.

Figure 10:
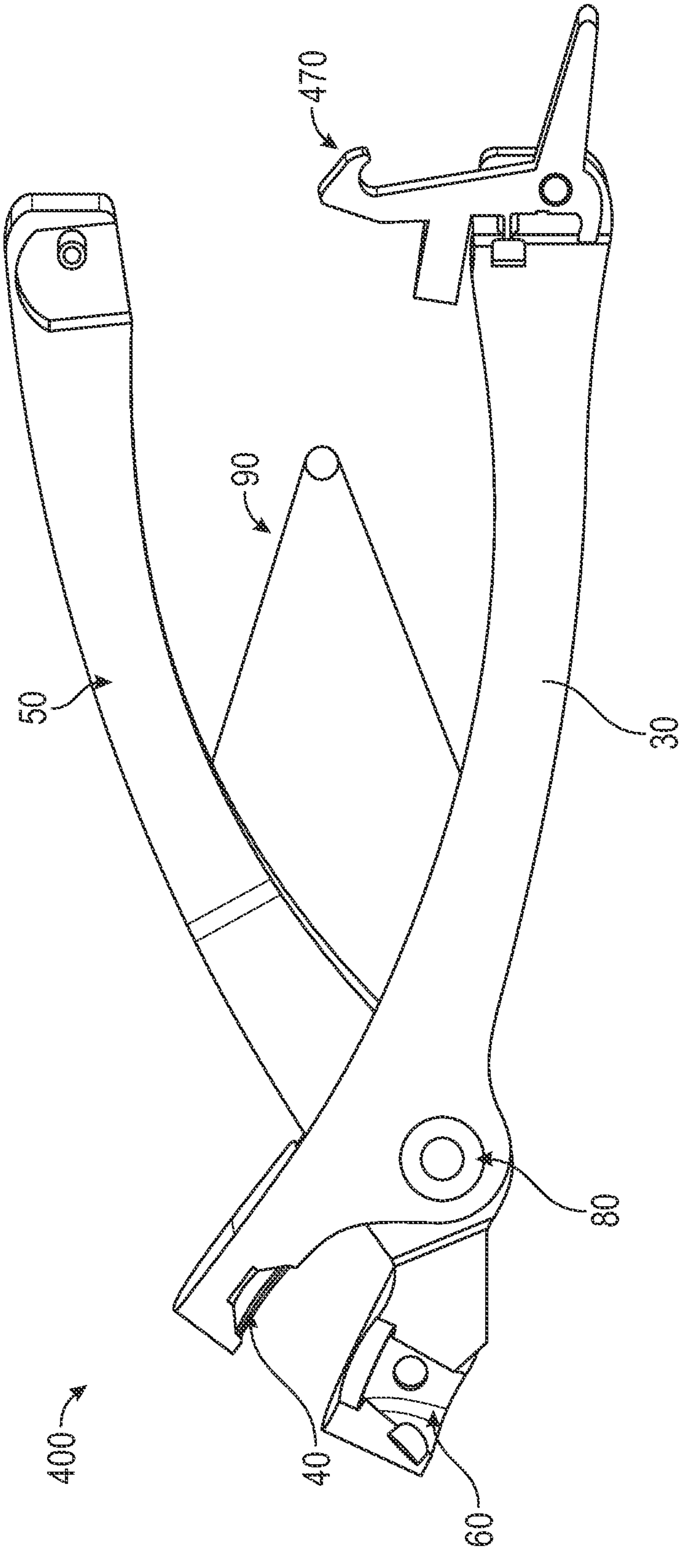
FIG. 10 is a perspective view of another embodiment of a pair of cleco pliers in accordance with principles disclosed herein.

Referring now to FIG. 10 another embodiment of cleco pliers 400 is shown. Cleco pliers 400 includes features in common with cleco pliers 10 shown in FIGS. 1-9, and shared figures are labelled similarly. Particularly, in this exemplary embodiment, cleco plier 400 generally includes the pair of handles 30 and 50, coupling assembly 80, bearing assembly 85, torsion spring 90, and a catch assembly 470 which varies in configuration from the catch assembly 70 of cleco pliers 10. Particularly, in this exemplary embodiment, it may be noted that the catch assembly 470 does not include the distal handle 75 of catch assembly 70 and instead only includes proximal handle 77. In this configuration, cleco pliers 400 are configured to operate in the same was as the cleco pliers 10 except that the catch assembly 70 is configured to release using only the proximal handle 77. Further, although in this exemplary embodiment catch assembly 470 includes proximal handle 77 but not distal handle 75, it may be understood that still other embodiments of catch assemblies in accordance with principles disclosed herein may include only distal handle 75 and not proximal handle 77.

While disclosed embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A pair of cleco pliers for installing and removing temporary fasteners, the cleco pliers comprising:

a first handle, extending between a proximal end and a longitudinally opposed distal end, the first handle having a pair of lateral sides extending between the proximal end of the first handle and the distal end of the first handle, wherein the first handle defines a first receptacle at the distal end;

a second handle pivotably coupled to the first handle and extending between a proximal end and a longitudinally opposed distal end of the second handle, the second handle having a pair of lateral sides extending between the proximal end of the second handle and the distal end of the second handle, wherein the second handle defines a second receptacle at the distal end of the second handle, wherein the first receptacle and the second receptacle are configured to jointly receive a temporary fastener; and one or more magnets received in at least one of the first receptacle and the second receptacle configured to secure the temporary fastener within the first receptacle and the second receptacle via a magnetic biasing force applied by the one or more magnets to the temporary fastener;

wherein the one or more magnets comprises a first magnet received in the first receptacle aligned with a longitudinal central axis of the first receptacle and configured to apply a magnetic biasing force to a terminal end of the temporary fastener when the temporary fastener is jointly received in the first receptacle and the second receptacle and a second magnet received in the second receptacle offset from a longitudinal central axis of the second receptacle that extends at a non-zero angle relative to the longitudinal central axis of the first receptacle, and wherein the second magnet is configured to apply an orienting force to the temporary fastener when the temporary fastener is jointly received in the first receptacle and the second receptacle, urging the temporary fastener to pivot about the terminal end thereof.

2. The cleco pliers of claim 1, wherein the one or more magnets comprises a first magnet received in the first receptacle and a second magnet received in the second receptacle.

3. The cleco pliers of claim 1, wherein the one or more magnets comprises a third magnet also received in the second receptacle and circumferentially spaced about the central axis of the second receptacle.

4. The cleco pliers of claim 1, wherein the one or more magnets comprises a pair of magnets received in the second receptacle, the pair of magnets circumferentially spaced about a central axis of the second receptacle.

5. The cleco pliers of claim 4, wherein the pair of magnets are each offset from the central axis of the second receptacle.

6. The cleco pliers of claim 1, further comprising a bearing assembly coupled between the first handle and the second handle comprising one or more annular bearings for rotatably coupling the first handle with the second handle.

7. The cleco pliers of claim 1, further comprising a catch assembly coupled to at least one of the first handle and the second handle that comprises a locking member for maintaining the cleco pliers in a locked configuration.

* * * * *